(12) United States Patent
Staffin et al.

(10) Patent No.: US 9,412,092 B2
(45) Date of Patent: Aug. 9, 2016

(54) GENERATING A FILTERED VIEW OF A CONTENT STREAM

(71) Applicant: Google Inc., Mountain View, CA (US)

(72) Inventors: Benjamin A. Staffin, Mountain View, CA (US); Frances B. Haugen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 353 days.

(21) Appl. No.: 13/740,719

(22) Filed: Jan. 14, 2013

(65) Prior Publication Data

US 2016/0196530 A1 Jul. 7, 2016

(51) Int. Cl.
*G06F 17/30* (2006.01)
*G06Q 10/10* (2012.01)

(52) U.S. Cl.
CPC .................................... *G06Q 10/10* (2013.01)

(58) Field of Classification Search
CPC combination set(s) only.
See application file for complete search history.

(56) References Cited

U.S. PATENT DOCUMENTS

| 7,269,590 | B2 | 9/2007 | Hull | |
|---|---|---|---|---|
| 8,065,618 | B2 | 11/2011 | Kumar | |
| 2007/0250791 | A1* | 10/2007 | Halliday et al. | 715/808 |
| 2011/0107294 | A1 | 5/2011 | Ionfrida | |
| 2012/0143996 | A1* | 6/2012 | Liebald et al. | 709/219 |
| 2013/0030987 | A1 | 1/2013 | Zuckerberg | |
| 2013/0073976 | A1* | 3/2013 | McDonald et al. | G06F 17/30867 |
| 2013/0073995 | A1* | 3/2013 | Piantino et al. | G06F 3/048 |
| 2013/0179502 | A1* | 7/2013 | Faller et al. | G06F 17/30867 |
| 2014/0006420 | A1* | 1/2014 | Sparrow et al. | G06Q 3/02 |
| 2014/0108395 | A1 | 4/2014 | Polonsky | |

* cited by examiner

*Primary Examiner* — Etienne Leroux
(74) *Attorney, Agent, or Firm* — Fish & Richardson P.C.

(57) ABSTRACT

A method performed by one or more processing devices includes receiving information specifying one or more attributes of a story; identifying, from a social graph, items of data with attributes matching at least one of the one or more attributes of the story, and connections to an item of data representing a user for whom the story is generated; identifying content items associated with the identified items of data; generating, based on the identified content items, data for a graphical user interface that when rendered by a device used by the user, includes: a visual representation of the story.

20 Claims, 5 Drawing Sheets

GENERATING A FILTERED VIEW OF A CONTENT STREAM

BACKGROUND

This specification relates to applying filters to information that is accessed through a social networking service.

Generally, a social networking service includes a platform that promotes building of social connections, e.g., among people with shared interests and/or activities. Generally, a social connection may be represented by a relationship between nodes in a graph representing users of the social networking service.

In an example, the social networking service generates content streams for display of information posted by a user and/or related to the user. Generally, a content stream includes items of electronic (e.g., Web-based) content displayed in a portion of a graphical user interface designated for display of the items of electronic content. Types of items of electronic content include posts, links, images, and so forth, which are collectively referred to herein as content items, for purposes of convenience, and without limitation.

In this example, the social networking service is configured to populate the content stream with content items related to a user, including, e.g., content items that that have been transmitted by the user, content items that include information about the user and have been transmitted by other users, and so forth.

SUMMARY

In general, one innovative aspect of the subject matter described in this specification can be embodied in methods that include the actions of receiving a request to filter content items displayed in a content stream, with the request specifying one or more criteria for filtering of the content stream; traversing a social graph to identify items of data with attributes satisfying at least one of the one or more criteria and connections to the user; identifying content items associated with the identified items of data; generating a filtered view of the content stream, wherein the filtered view includes the content items identified and excludes the other content items displayed in the content stream. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. In some implementations, the identified items of data include one or more of: an item of data representing another user of the social network; an item of data representing a type of content item in the social network; and an item of data representing a content item in the social network. In other implementations, the content items identified include a subset of the content items displayed in the content stream. In still other implementations, a content item is associated with metadata, and identifying includes: searching, in a data repository, for content items with metadata that satisfy at least one of the one or more criteria.

In some implementations, the features include receiving information designating the filtered view as a default content stream. In still other implementations, the features include transmitting, to a device used by the user, information for displaying the filtered view. In some implementations, the features also include receiving information that tags a content item in the content stream; and storing the information received as metadata for the content item.

In general, another innovative aspect of the subject matter described in this specification can be embodied in methods that include the actions of receiving information specifying one or more attributes of a story; identifying, from a social graph, items of data with attributes matching at least one of the one or more attributes of the story, and connections to an item of data representing a user for whom the story is generated; identifying content items associated with the identified items of data; generating, based on the identified content items, data for a graphical user interface that when rendered by a device used by the user, includes: a visual representation of the story. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. In some implementations, the identified items of data include one or more of: an item of data representing another user of the social network; an item of data representing a type of content item in the social network; and an item of data representing a content item in the social network. In other implementations, the content items identified include a subset of content items displayed in a content stream of the user.

In still other implementations, identifying, from the social graph, the items of data includes: traversing the social graph to identify the items of data with attributes matching at least one of the one or more attributes of the story, and connections to an item of data representing the user for whom the story is generated. In yet other implementations, the visual representation of the story includes a filtered view of a content stream of the user, wherein the filtered view includes the identified content items.

In some implementations, the features include receiving information designating the filtered view as a default content stream. The features may also include transmitting, to a device used by the user, the data for the graphical user interface.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Described herein is a system that generates a filtered view of a content stream. Generally, a filtered view includes a display of a subset of content items in the content stream. In an example, the filtered view is generated based on search criteria specifying types of content items to be displayed in the filtered view. In this example, the system selects, from the content stream, content items that are associated with metadata satisfying the search criteria. Generally, metadata includes an item of data about another item of data. The selected content items are displayed in the filtered view.

Figure 1:
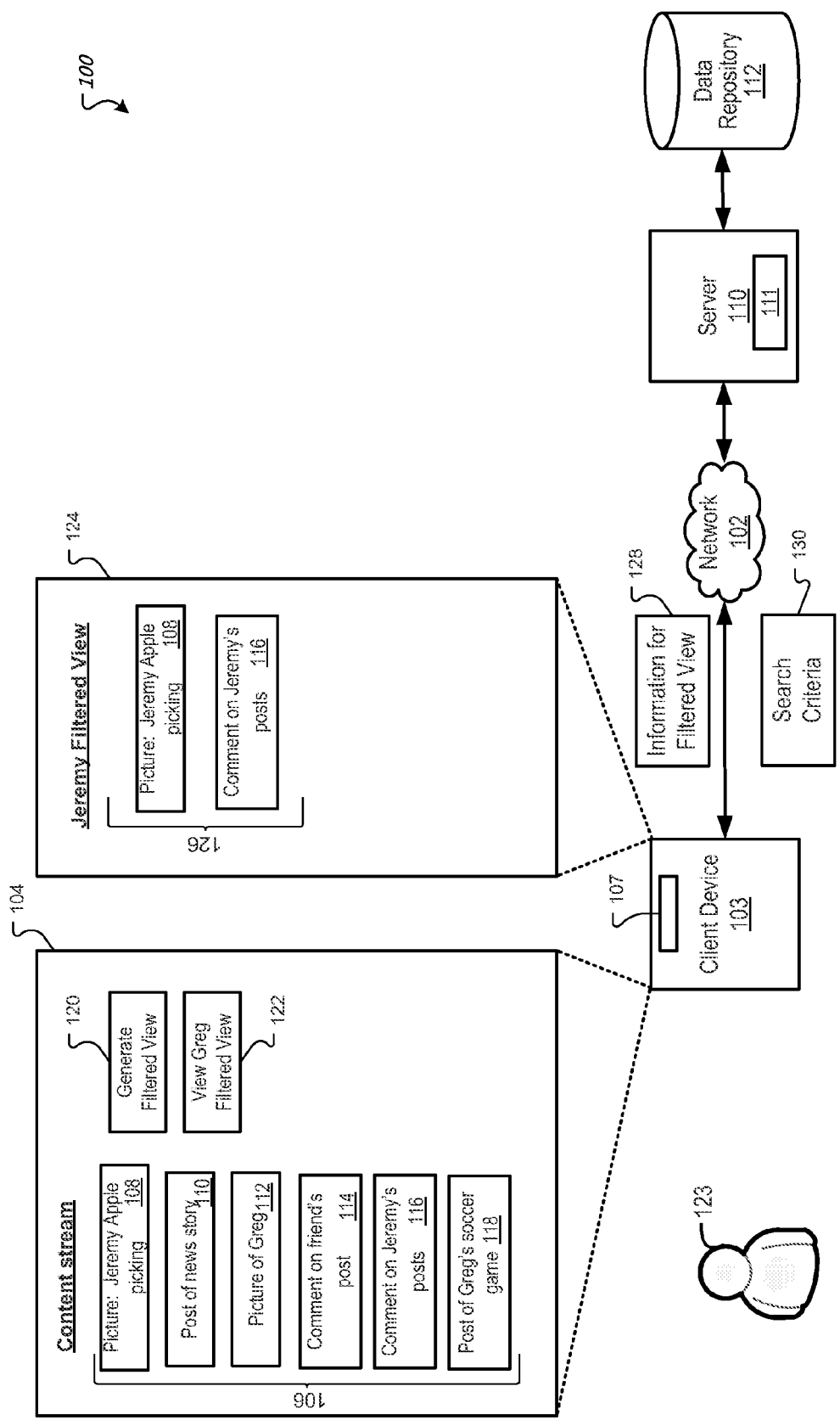
FIG. 1 is a diagram of an example of a network environment for generating a filtered view of a content stream.

FIG. 1 is a diagram of an example of network environment 100 for generating filtered view 126 of content stream 106. Network environment 100 includes network 102, client device 103, server 110, data repository 112, and user 123. In the example of FIG. 1, user 123 may use client device 103.

Client device 103 can communicate with server 110 over network 102. Network environment 100 may include many thousands of data repositories, client devices and servers, which are not shown. Server 110 may include various data engines, including, e.g., data engine 111. Although data engine 111 is shown as a single component in FIG. 1, data engine 111 can exist in one or more components, which can be distributed and coupled by network 102.

In the example of FIG. 1, data engine 111 is configured to implement a social networking service (not shown). Through the social networking service, user 123 transmits, to server 110, content items 108, 110, 112, 114, 116, 118, e.g., content items about user 123 and/or content items about other users of the social networking service. In response, data engine 111 stores content items 108, 110, 112, 114, 116, 118 in data repository 112. In an example, content items 108, 110, 112, 114, 116, 118 are stored in association with an identifier for user 123. Through the identifier, content items 108, 110, 112, 114, 116, 118 are associated with user 123.

In the example of FIG. 1, a content item is also associated with metadata. There are numerous ways in which a content item is associated with metadata.

In an example, the metadata includes data that is included in the content item. In this example, content item 116 includes a comment made by user 123 about a post of another user, including, e.g., a user named Jeremy. In this example, metadata for content item 116 includes contents of the comment made by user 123. The contents of the comment made by user 123 include the word "Jeremy."

In another example, content item 108 includes an image that has been transmitted, to server 110, by client device 103. In this example, content item 108 also includes a comment about the image. In the example of FIG. 1, the comment includes the words "Jeremy apple picking." The metadata for content item 108 includes the contents of the comment.

In this example, content item 108 also includes metadata indicative of a geographic location of the image in content item 108. In this example, client device 103 includes a camera (not shown). User 123 uses the camera to capture the image included in content item 108. Client device 103 may include software to determine a geographic location from which the image is captured. Client device 103 may embed the geographic location as metadata in the image. In this example, the metadata of content item 108 includes the geographic location embedded with the image.

In still another example, user 123 tags content item 108 with metadata. Generally, a tag includes information provided by a user about contents of a content item. In this example, user 123 may tag content item 108, e.g., after content item 108 is stored in data repository 112. In this example, data engine 111 is configured to update metadata for content item 108 with data included in the tag.

In an example, user 123 accesses the social networking service through a web page that is rendered by client device 103. Through the web page, user 123 transmits, to server 110, a request (not shown) for content stream 106. In the example of FIG. 1, content stream 106 includes content items 108, 110, 112, 114, 116, 118 that are associated with user 123, e.g., through the identifier associated with user 123. In response to the request, data engine 111 queries data repository 112 for content items 108, 110, 112, 114, 116, 118 that are associated with the identifier for user 123.

Server 110 transmits, to client device 103, information (not shown) for displaying content stream 106. Using the information transmitted from server 110, client device 103 generates graphical user interface 104, e.g., via application 107 on client device 103. In an example, application 107 includes a web browser. Graphical user interface 104 displays content stream 106.

Graphical user interface 104 also displays controls 120, 122 for use with content stream 106. In the example of FIG. 1, control 120 is for specifying search criteria 130 to be used in generating filtered view 126 of content stream 106.

Upon selection of control 120, user 123 is prompted to specify search criteria 130 to be used in generating filtered view 126. The specified search criteria 130 may include one or more words to be used in identifying which of content items 108, 110, 112, 114, 116, 118 are included in filtered view 126.

In an example, user 123 enters search criteria 130 that includes the following words "Jeremy." In this example, data engine 111 stores, in data repository 112, search criteria 130. Using search criteria 130, data engine 111 also generates control 122, selection of which causes client device 103 to display filtered view 126.

In the example of FIG. 1, client device 103 updates graphical user interface 104 with control 122. In an example, a script is embedded in control 122. Generally, a script includes a set of instructions that are executable to cause a device to perform various operations. The script includes search criteria 130 specified by user 123, e.g., following selection of control 120. Following selection of control 122, client device 103 executes the script to transmit search criteria 130 to server 110.

Using search criteria 130, data engine 111 generates a search query that includes a request for content items satisfying search criteria 130, including, e.g., the word "Jeremy." In the example of FIG. 1, a search query may also include an identifier of user 123. Based on the identifier of user 123 and search criteria 130, a search query includes a request to search for content items that are (i) associated with the identifier of user 123, and (ii) associated with metadata satisfying search criteria 130.

Following generation of a search query, data engine 111 searches data repository 112 for metadata of content items 108, 110, 112, 114, 116, 118 that include the word "Jeremy." In the example of FIG. 1, content items 108, 116 are associated with metadata that include the word "Jeremy." In this example, data engine 111 selects content items 108, 116 for display in filtered view 126. Data engine 111 generates information 128 for displaying graphical user interface 124 with filtered view 126. Data engine 111 sends information 128 to client device 103. Using information 138, application 107 on client device 103 generates graphical user interface 124 and displays filtered view 126.

In an example, content items included in content stream 106 may change over time, e.g., as user 123 posts new content items. In this example, some of the new content items may include metadata associated with search criteria 130 specified by user 123, e.g., following selection of control 120.

Rather than including a static list of content items, filtered view 126 includes a list of content items that is dynamically generated. For example, data engine 111 is configured to dynamically generate filtered view 126 based on an execution of a search query. Through the dynamic generation of filtered view 126, filtered view 126 may include the new content items with metadata that satisfies search criteria 130.

In a variation of FIG. 1, data repository 112 stores a search query, e.g., based on search criteria 130 specified through control 120. In this example, selection of control 122 may send a request, to server 110, for execution of the search query. Following execution of the search query, data engine 111 populates filtered view 126 with content items that satisfy search criteria 130 specified in the search query.

In this example, data engine 111 may provide user 123 with a graphical user interface (not shown) with controls that allow user 123 to select a default content stream. Generally, a default content stream includes a content stream that is displayed when user 123 logs into the social networking service. In this example, the default content stream may include content stream 106, filtered view 126, and so forth.

Figure 2:
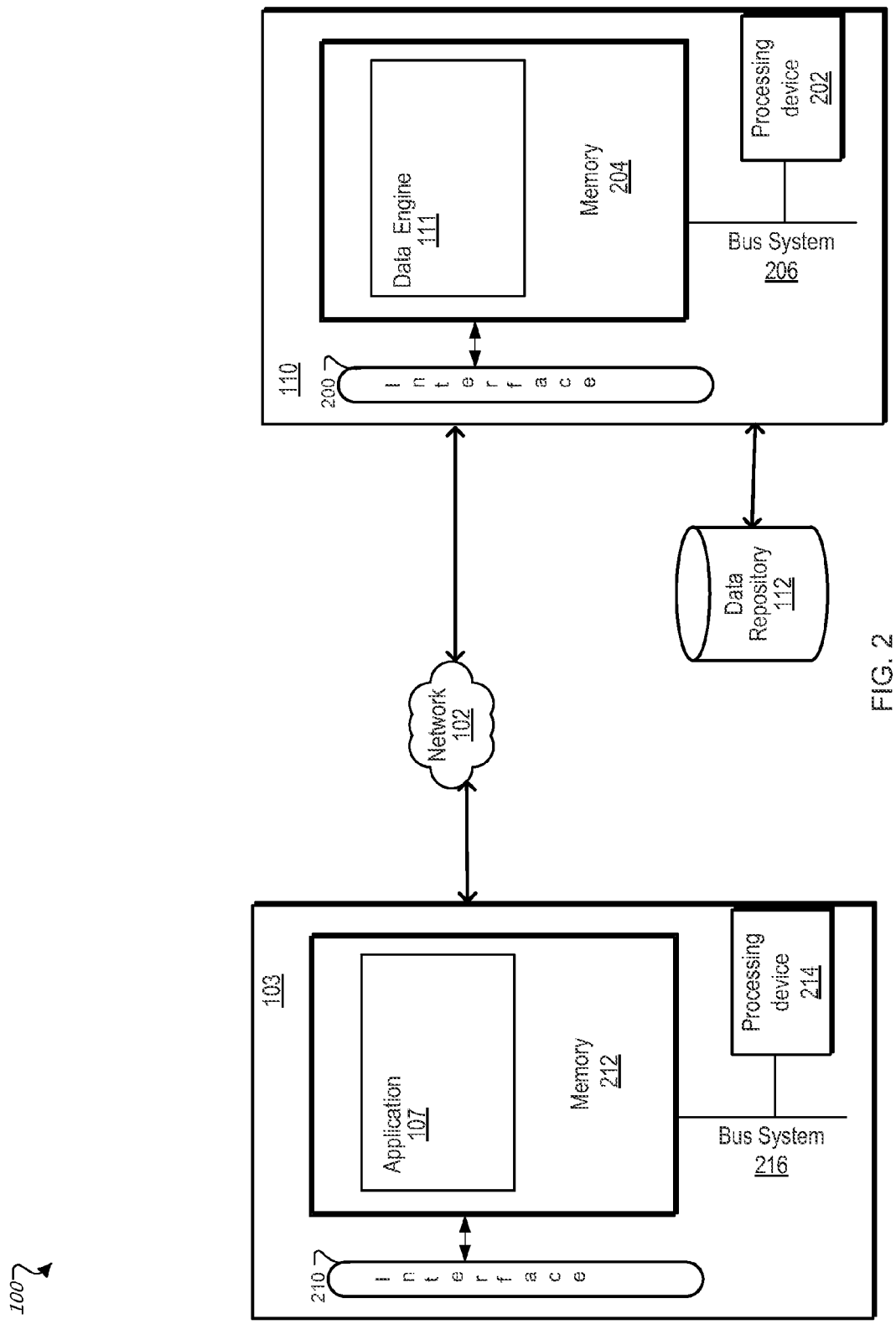
FIG. 2 is a block diagram showing examples of components of the network environment for generating a filtered view of a content stream.

FIG. 2 is a block diagram showing examples of components of network environment 100 for generating filtered view 126 of content stream 106. In the example of FIG. 2, graphical user interfaces 104, 124, contents of graphical user interfaces 104, 124, user 123, information 128 and search criteria 130 are not shown.

Client device 103 can be a computing device capable of taking input from user 123 (FIG. 1) and communicating over network 102 with server 110 and/or with other computing devices. For example, client device 103 can be a mobile device, a desktop computer, a laptop, a cell phone, a personal digital assistant (PDA), a server, an embedded computing system, a mobile device, and the like. Network environment 100 can include a plurality of computing devices, which can be geographically dispersed.

Network 102 can include a large computer network, including, e.g., a local area network (LAN), wide area network (WAN), the Internet, a cellular network, or a combination thereof connecting a number of mobile computing devices, fixed computing devices, and server systems. The network(s) may provide for communications under various modes or protocols, including, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, including, e.g., using a Bluetooth, WiFi, or other such transceiver.

Server 110 can be a variety of computing devices capable of receiving data and running one or more services, which can be accessed by client device 103. In an example, server 110 can include a server, a distributed computing system, a desktop computer, a laptop, a cell phone, a rack-mounted server, and the like. Server 110 can be a single server or a group of servers that are at a same location or at different locations. Client device 103 and server 110 can run programs having a client-server relationship to each other. Although distinct modules are shown in the figures, in some examples, client and server programs can run on the same device.

Server 110 can receive data from client device 103 (and/or from data repository 112) through input/output (I/O) interface 200. I/O interface 200 can be a type of interface capable of receiving data over a network, including, e.g., an Ethernet interface, a wireless networking interface, a fiber-optic networking interface, a modem, and the like. Server 110 also includes a processing device 202 and memory 204. A bus system 206, including, for example, a data bus and a motherboard, can be used to establish and to control data communication between the components of server 110.

Processing device 202 can include one or more microprocessors. Generally, processing device 202 can include an appropriate processor and/or logic that is capable of receiving and storing data, and of communicating over a network (not shown). Memory 204 can include a hard drive and a random access memory storage device, including, e.g., a dynamic random access memory, or other types of non-transitory machine-readable storage devices. As shown in FIG. 2, memory 204 stores computer programs that are executable by processing device 202. These computer programs include data engine 111. Data engine 111 can be implemented in software running on a computer device (e.g., server 110), hardware or a combination of software and hardware.

Client device 103 can receive data from server 110 through I/O interface 210. Client device 103 also includes a processing device 214 and memory 212. A bus system 216, including, for example, a data bus and a motherboard, can be used to establish and to control data communication between the components of client device 103. As shown in FIG. 2, memory 212 stores computer programs that are executable by processing device 214. These computer programs include application 107.

Figure 3A:
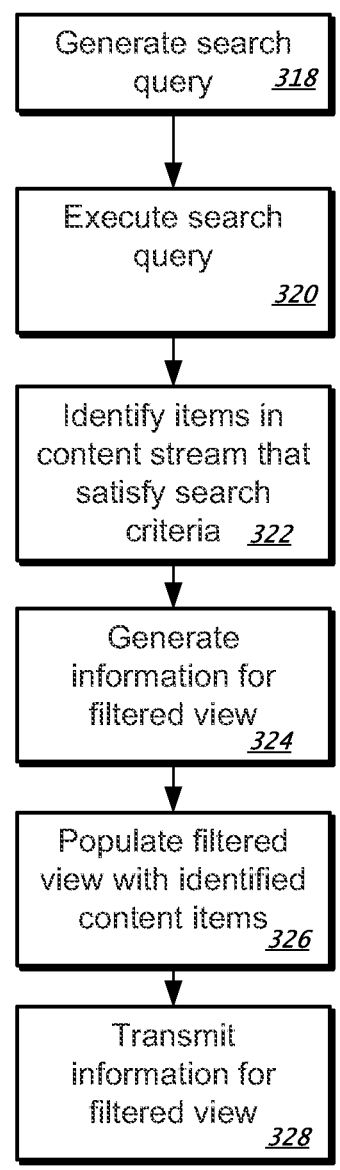
FIG. 3A is a flowchart showing a process for generating a filtered view of a content stream.

FIG. 3A is a flowchart showing a process 300 for generating filtered view 126 of content stream 106. In FIG. 3A, process 300 is performed on server 110 (and/or by data engine 111 on server 110).

In operation, server 110 receives search criteria 130. Using search criteria 130, a search query is generated (318). For example, data engine 111 generates (318) a search query. In an example, data engine 111 stores the search query in data repository 112.

In another example, data engine 111 also uses search criteria 130 in generating control 122. In this example, control 122 includes a script with search criteria 130. In this example, execution of the script, in control 122, causes client device 103 to transmit search criteria 130 (and/or an identifier for search criteria 130) to server 110 for implementation. In an example, server 110 causes graphical user interface 104 to be updated with control 122, e.g., by sending to client device 103 information indicative of control 122.

A search query is executed (320). For example, data engine 111 executes (320) a search query. Based on execution of a search query, content items 108, 116, in content stream 106, that satisfy search criteria 130 are identified (322). For example, data engine 111 identifies (322) content items 108, 116, in data repository 112, that are included in content stream 106 and that are associated with metadata satisfying search criteria 130. Data engine 111 identifies content items that are included in content stream 106 by identifying, in data repository 112, content items that are associated with the identifier for user 123.

Information 128 for filtered view 126 is generated (324). In an example, data engine 111 generates (324) information 128 that when rendered by application 107 displays filtered view 126 in graphical user interface 124.

Filtered view 126 is populated with content items 108, 116 that satisfy search criteria 130 (326). For example, data engine 111 populates (326) information 128 for filtered view 126 with content items 108, 116.

Information 128 for filtered view 126 is transmitted (328). For example, data engine 111 transmits (328) information 128 for filtered view 126 to client device 103.

Figure 3B:
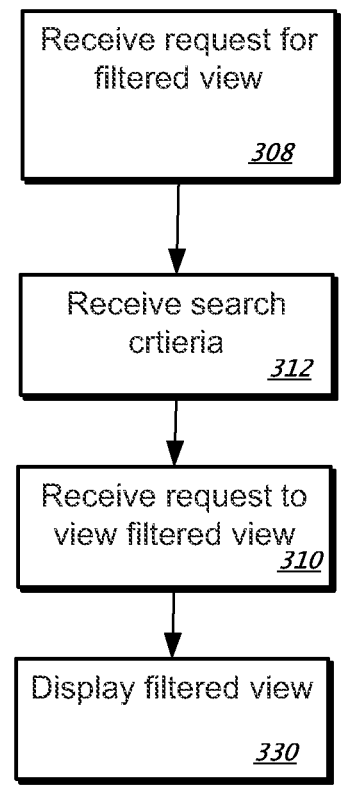
FIG. 3B is a flowchart showing a process for displaying a filtered view of a content stream.

FIG. 3B is a flowchart showing process 301 for displaying filtered view 126 of content stream 106. In FIG. 3B, process 301 is performed on client device 103 (and/or by application 107 on client device 103).

In operation, a request for filtered view 126 of content stream 106 is received (308). For example, client device 103 receives (308) a request for filtered view 126. In this example, client device 103 receives the request following selection of control 120 in graphical user interface 104. In response to the request, graphical user interface 104 is updated with information (not shown) that prompts user 123 to enter search criteria 130 to be used in generating filtered view 126. In an example, graphical user interface 104 includes a script. Selection of control 120 causes application 107 to execute the script. Execution of the script causes graphical user interface 104 to be updated with the information prompting user 123 for search criteria 130.

In this example, search criteria 130 are received (312). For example, application 107 receives (312) search criteria 130. In response, client device 103 transmits (not shown) search criteria 130 to server 110.

In the example of FIG. 3B, a request to view filtered view 126 is received (310), e.g., following entry of search criteria 130. For example, application 107 receives (310) the request, following selection of control 122. In response to the request, client device 103 transmits, to server 110, search criteria 130 (and/or the identifier for search criteria 130).

In response to transmission of search criteria 130, client device 103 receives information 128. Using information 128, filtered view 126 is displayed in graphical user interface 124 (330). For example, application 107 displays (330) filtered view 126 by using information 128 to generate graphical user interface 124 that displays filtered view 126.

Figure 4:
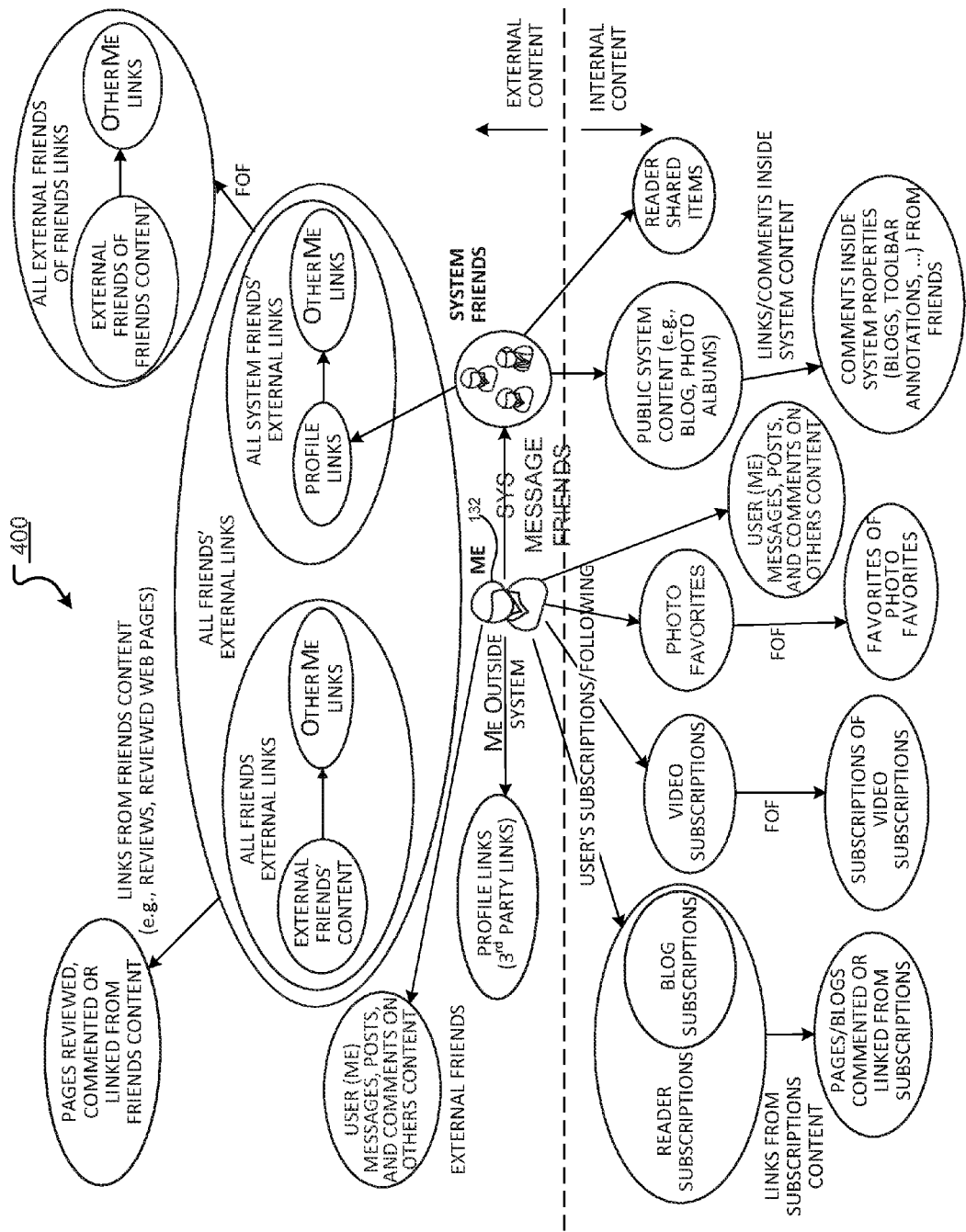
FIG. 4 is a conceptual view of an example social graph.

FIG. 4 is a conceptual view of an example social graph 400. A social graph is a way to represent, graphically, social connections between two parties that may, or may not, be on the same social network, and to represent connections between parties and content. A party may be an individual (e.g., user 123) or an entity, e.g., a company, organization, country, or the like.

In an example, content items 108, 110, 112, 114, 116, 118 are associated with user 123 through one or more connections in a social graph (e.g., social graph 400). In this example, data engine 111 generates filtered view 126 by filtering, in accordance with search criteria 130, content items that are connected to user 123 in the social graph.

Types of connections in social graphs may include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph may include connections within a single network or across multiple networks.

In an example, content items 108, 110, 112, 114, 116, 118 are associated with user 123 through one or more connections in a social graph (e.g., social graph 400). In this example, data engine 111 generates filtered view 126 by filtering, in accordance with search criteria 130, content items that are connected to user 123 in the social graph.

Distinct social graphs may be generated for different types of connections. For example, a user may be connected with chat contacts in one social graph, electronic message contacts in a second social graph, and connections from a particular social network in a third social graph. A social graph may include edges to additional parties at greater degrees of separation from the user. For example, an electronic message contact may have its own electronic message contacts to others adding a degree of separation from the user (e.g., user→electronic message contact→contact of electronic message contact). These contacts may, in turn, may have additional contacts at another degree of separation from the user. Similarly, a party's connection to someone in a particular social network may be used to identify additional connections based on that person's connections. Distinct social graphs may include edges connecting one or more social graph to one or more other social graphs. Thus, a social graph may include a single social graph or multiple interconnected social graphs.

As noted, users may designate content as endorsed, share or comment on content, quote URLs, or otherwise indicate an interest or liking of content, examples of which include, but are not limited to, a particular resource, Web page, or search result. For example, an application, widget, or scripting may be provided in search results pages, Web pages, or within a browser application that allows a user to indicate liking, sharing, or other evaluation of an associated resource or search result. The user may mark the particular resource, Web site, or search results to indicate endorsement or other evaluation (e.g., through a browser control or user interface element presented with the associated content). Such relationships to information from others may be captured in a user's social graph.

Affinity between entities of a social graph may be represented by the above-noted edges in the user' social graph. As noted, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific in some cases. For example, social graph data may identify specific types of content associated with an edge between parties and specific affinities for that content. In an example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about baseball and a second, different level of affinity for the second party's content about basketball.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other. In still other examples, if two users interact with the same people regularly or frequently, those two users may be considered to have an affinity with one other.

Among other things, FIG. 4 shows sources of information for a social graph. In this example, the user's social graph is a collection of connections (e.g., users, resources/content, etc.) identified as having a relationship to user 132 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 4 shows that it is possible to extend the user's social graph to people and content both within a single network and across one or more external networks. For example, the user may have a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profiles that include connections to resources as well as contacts of the respective contacts, a set of interests, and so forth. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index (not shown) in data repository 112. Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph). The indexed social graph information may be updated intermittently or periodically, for example, to include recently added information associated with the user's social graph. The indexed social graph information may also be updated, e.g., on an on-going basis to reflect relationships determined in accordance with the processes described herein.

In some implementations, a user may prevent addition of members to the user's social graph, e.g., by keeping contacts out of particular groups used to generate the social graph. In some implementations, privacy features enable a user to allow or to prevent, respectively, being included (or removed the user if already included) as a member of another's social graph. Thus, users may have control over what personal information or connection information, if existing, is included in their social graphs and, consequently, that is included in the content streams and search results described herein.

Using the techniques described herein, a system is configured to generate a filtered view of a content stream. In an example, the system generates the filtered view based on search criteria 130. In this example, the system identifies content items that satisfy search criteria 130. The system populates the filtered view with the identified content items.

In an example, data engine 111 allows user 123 to create custom views of a full content stream. Using a query based interface, user 123 can pare down his/her full stream of content into smaller streams. For example, user 123 may take a large number of photos and upload the photos to server 110. In this example, all the photos posted would show up in a content stream for user 123. However, in this example, user 123 can tag a subset of photos as #PortfolioWorthy and then create a substream (e.g., filtered view) that includes content matching the search "#PortfolioWorthy". In this example, user 123 will be able to save this filtered view with a title. The filtered view will become viewable to people who look at the portfolio of user 123. In this example, user 123 might title this filtered view as "My Portfolio."

In an example, user 123 may select one of these filtered views (e.g., the "My Portfolio" filtered view) to be the default view of the profile for user 123. In this example, when another user of the social network visits the profile of user 123, the other user would be presented with the filtered view "My Portfolio."

In another example, user 123 becomes engaged to a fiancé. In this example, user 123 requests that data engine 111 generate a story of the relationship between user 123 and the fiancé. In this example, the story includes content items (e.g., posts, photos, and so forth) satisfying various attributes, including, e.g., content items that involve/refer to user 123 and the fiancé together. In this example, an attribute includes a quality and/or a characteristic of an item of data. In this example, user 123 also specifies that the filtered view is displayed by default in a profile of user 123. In this example, the profile of user 123 displays a visual representation of a story of a relationship between user 123 and the fiancé.

In another example, a mother with three makes three filtered views of her profile, with each filtered view being for one of her children. In this example, upon selection of one of the filtered views, the social network presents content about a specific child associated with the filtered view.

In still another example, another user of the social network has a side business giving tours. In this example, the user posts content and endorses content when she holds a tour. In this example, the user generates a filtered view to return her tour posts for her future clients to see. In this example, by setting her profile to display the filtered view, her profile displays a subset of the information associated with the user (e.g., a subset of the total amount of information that is included in the user's profile).

In the foregoing examples, a user specifies, to the social network, attributes of a story that the user wants to tell. In this example, the story includes the content items that are displayed in the filtered view. In this example, using the attributes for the story, data engine 111 identifies, in a social graph, items of data with attributes matching at least one of the one or more attributes of the story, and connections to an item of data representing a user for whom the story is generated. The identification may be based on a traversal of the graph. Data engine 111 also identifies content items associated with the identified items of data. Data engine 111 also generates data for a graphical user interface that when rendered by a device used by the user, includes: a visual representation of the story. In an example, the filtered view may include the visual representation of the story. In this example, the user may share stories with other users of the social networking, e.g., when other users view the profile of the user telling the story.

In some implementations in which the systems discussed herein collect personal information about users, or may make use of personal information, the users may be provided with an opportunity to control whether programs or features may collect personal information (e.g., information about a user's social network, social actions or activities, a user's preferences, or a user's current location), or to control whether and/or how to receive content from a server that may be more relevant to the user. In other implementations, certain data may be modified in one or more ways before it is stored or used, so that personally identifiable information is removed (and/or modified) when generating monetizable parameters (e.g., monetizable demographic parameters). For example, a user's identity may be modified so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a server.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more processing devices, comprising:
   receiving, from a first user, information specifying one or more attributes of a story related to a second user;
   obtaining content items from a social network, with the content items comprising one or more content items in the social network related to the story and related to the second user and one or more content items in the social network unrelated to the story and related to the second user;
   filtering the obtained content items to include only one or more of the one or more content items related to the story and related to the second user, with a content item being related to the story when the content item satisfies one or more of the one or more attributes, and with the content item being related to the second user when a node representing the content item in a social graph of the social network is connected in the social graph to another node representing the second user; and generating, based on the filtered content, data for a graphical user interface that when rendered by a device used by the first user, comprises a visual representation of the story.

2. The method of claim 1, wherein the content items comprise a subset of content items displayed in a content stream of the second user.

3. The method of claim 1, wherein obtaining the content items comprises: traversing the social graph of the social network to identify content items associated with the second user.

4. The method of claim 1, further comprising:
receiving information designating the filtered content as a default content stream for the second user.

5. The method of claim 1, further comprising:
transmitting, to a device, the data for the graphical user interface.

6. The method of claim 1, wherein the one or more attributes comprise information identifying a subject of the story, the subject being a person who is different from the second user.

7. The method of claim 1, wherein the first user is a same user as the second user.

8. The method of claim 1, wherein the first user differs from the second user.

9. One or more non-transitory machine-readable media storing instructions that are executable by one or more processing devices to perform operations comprising:
receiving, from a first user, information specifying one or more attributes of a story related to a second user;
obtaining content items from a social network, with the content items comprising one or more content items in the social network related to the story and related to the second user and one or more content items in the social network unrelated to the story and related to the second user;
filtering the obtained content items to include only one or more of the one or more content items related to the story and related to the second user, with a content item being related to the story when the content item satisfies one or more of the one or more attributes, and with the content item being related to the second user when a node representing the content item in a social graph of the social network is connected in the social graph to another node representing the second user; and
generating, based on the filtered content, data for a graphical user interface that when rendered by a device used by the first user, comprises a visual representation of the story.

10. The one or more non-transitory machine-readable media of claim 9, wherein the content items comprise a subset of content items displayed in a content stream of the second user.

11. The one or more non-transitory machine-readable media of claim 9, wherein obtaining the content items comprises:
traversing the social graph of the social network to identify content items associated with the second user.

12. The one or more non-transitory machine-readable media of claim 9, wherein the operations further comprise:
receiving information designating the filtered content as a default content stream for the second user.

13. The one or more non-transitory machine-readable media of claim 9, wherein the operations further comprise:
transmitting, to a device, the data for the graphical user interface.

14. The one or more non-transitory machine-readable media of claim 9, wherein the one or more attributes comprise information identifying a subject of the story, the subject being a person who is different from the second user.

15. An electronic system comprising:
one or more processing devices; and
one or more machine-readable media storing instructions that are executable by the one or more processing devices to perform operations comprising:
receiving, from a first user, information specifying one or more attributes of a story related to a second user;
obtaining content items from a social network, with the content items comprising one or more content items in the social network related to the story and related to the second user and one or more content items in the social network unrelated to the story and related to the second user;
filtering the obtained content items to include only one or more of the one or more content items related to the story and related to the second user, with a content item being related to the story when the content item satisfies one or more of the one or more attributes, and with the content item being related to the second user when a node representing the content item in a social graph of the social network is connected in the social graph to another node representing the second user; and
generating, based on the filtered content, data for a graphical user interface that when rendered by a device used by the first user, comprises a visual representation of the story.

16. The electronic system of claim 15, wherein the content items comprise a subset of content items displayed in a content stream of the second user.

17. The electronic system of claim 15, wherein obtaining the content items comprises:
traversing the social graph of the social network to identify content items associated with the second user.

18. The electronic system of claim 15, wherein the operations further comprise:
receiving information designating the filtered content as a default content stream of the second user.

19. The electronic system of claim 15, wherein the operations further comprise:
transmitting, to a device, the data for the graphical user interface.

20. The system of claim 15, wherein the one or more attributes comprise information identifying a subject of the story, the subject being a person who is different from the second user.

* * * * *